United States Patent
Widmann

(10) Patent No.: US 10,658,836 B2
(45) Date of Patent: May 19, 2020

(54) METHOD FOR DETECTING A DEFECTIVE AMPLIFIER IN AN ANALOG SIGNAL CONDITIONING DEVICE OF A SWITCH

(71) Applicant: Siemens Aktiengesellschaft, Munich (DE)

(72) Inventor: Stefan Widmann, Freudenberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 736 days.

(21) Appl. No.: 14/337,287

(22) Filed: Jul. 22, 2014

(65) Prior Publication Data

US 2015/0062766 A1 Mar. 5, 2015

(30) Foreign Application Priority Data

Aug. 29, 2013 (DE) .......................... 10 2013 217 233

(51) Int. Cl.
*H02H 3/00* (2006.01)
*H02H 7/22* (2006.01)
(Continued)

(52) U.S. Cl.
CPC ............ *H02H 7/222* (2013.01); *H02H 3/044* (2013.01); *H02H 3/05* (2013.01); *H02H 3/08* (2013.01)

(58) Field of Classification Search
CPC .................................. H02H 7/22; H02H 7/222
(Continued)

(56) References Cited

U.S. PATENT DOCUMENTS 7,772,850 B2 * 8/2010 Bertness ............ G01R 31/3648
320/136
2002/0149422 A1 10/2002 Vermeeren
(Continued)

FOREIGN PATENT DOCUMENTS

CN 1460324 A 12/2003
CN 101741057 A 6/2010
(Continued)

OTHER PUBLICATIONS

German office action dated May 19, 2014—translation.*
German Office Acton dated May 19, 2014.
Chinese Office Action dated Jan. 2, 2018.

*Primary Examiner* — Thienvu V Tran
*Assistant Examiner* — Lucy M Thomas
(74) *Attorney, Agent, or Firm* — Harness, Dickey & Pierce, P.L.C.

(57) ABSTRACT

A method is disclosed for detecting a defective amplifier. The device includes an electronic tripping unit which respectively carries out a check in order to determine whether the energy through the switch satisfies a condition and trips the switch if the condition has been satisfied; and an analog/digital converter respectively outputting the two differently amplified analog signals as digital values. In an embodiment of the method, a decision is made regarding which of the two digital values is used to check the condition. To detect defective amplifiers in the signal conditioning device of tripping units during ongoing operation, a check is carried out to determine whether at least one of the two digital values is in a predefined range; if so, whether the two digital values each belonging to the same time are in a predefined tolerance range. A fault is signaled if this is not the case.

4 Claims, 1 Drawing Sheet

(51) Int. Cl.
*H02H 3/04* (2006.01)
*H02H 3/05* (2006.01)
*H02H 3/08* (2006.01)

(58) Field of Classification Search
USPC .................................................. 361/78, 42, 2
See application file for complete search history.

(56) References Cited

U.S. PATENT DOCUMENTS

2010/0118450 A1    5/2010  Ritzinger
2012/0280748 A1*  11/2012  Tronche ................ H03F 1/3247
330/124 R

FOREIGN PATENT DOCUMENTS

DE      102010036080     *  3/2012
DE      102010036080 A1    3/2012
EP         2315226 A2    4/2011

* cited by examiner

METHOD FOR DETECTING A DEFECTIVE AMPLIFIER IN AN ANALOG SIGNAL CONDITIONING DEVICE OF A SWITCH

PRIORITY STATEMENT

The present application hereby claims priority under 35 U.S.C. § 119 to German patent application number DE 102013217233.8 filed Aug. 29, 2013, the entire contents of which are hereby incorporated herein by reference.

FIELD

At least one embodiment of the invention generally relates to a method for detecting a defective amplifier in an analog signal conditioning device of a switch.

BACKGROUND

Switches having mechanically separable contact elements and a tripping unit are known as circuit breakers, for example. The tripping unit checks in each case whether the electrical energy flowing via the contact elements satisfies a predefined condition and trips the separation of the contact elements if the condition has been satisfied. An analog signal conditioning device is used to determine the electrical energy flow, which signal conditioning device comprises at least one sensor unit whose sensor directly or indirectly respectively emits an electrical analog signal proportional to the energy. The signal conditioning device also then usually has a normalizing stage for adaptation to different nominal currents. The normalized analog signal is then at least amplified by a downstream amplifier in order to increase the dynamic range of the downstream analog/digital converter, to the input of which the amplified analog signal is passed in addition to the analog signal which has not been amplified. The processor unit in the tripping unit respectively selects which of the two digitized analog signals (digital values) is used to check the predefined condition. In this case, the amplified analog signal is respectively not taken into account if it overloads the analog/digital converter.

If hardware defects occur in the analog signal conditioning device of the electronic tripping unit, these defects may result in the tripping unit no longer correctly responding in the event of a fault and not detecting a short circuit, for example.

When using amplifiers in the signal conditioning device, it is important to also detect their defects in order to avoid false tripping or absent tripping.

SUMMARY

At least one embodiment of the invention detects defective amplifiers in the signal conditioning device of electronic tripping units during ongoing operation.

At least one embodiment provides for a check to be carried out in order to determine whether at least one of the two digital values is in a predefined range and, if so, whether the two digital values of the differently amplified signals, which each belong to the same time, are in a predefined tolerance range. If this is not the case, a fault is signaled. The digital values of the differently amplified signals are compared with one another (in a particular range) (plausibility check). If the results are not within a predefined tolerance range (tolerance band), a hardware defect of the amplifier can be assumed. A fault is accordingly signaled.

BRIEF DESCRIPTION OF THE DRAWINGS

The invention is described in more detail below using an example embodiment. In the drawings.

DETAILED DESCRIPTION OF THE EXAMPLE EMBODIMENTS

Figure 1:
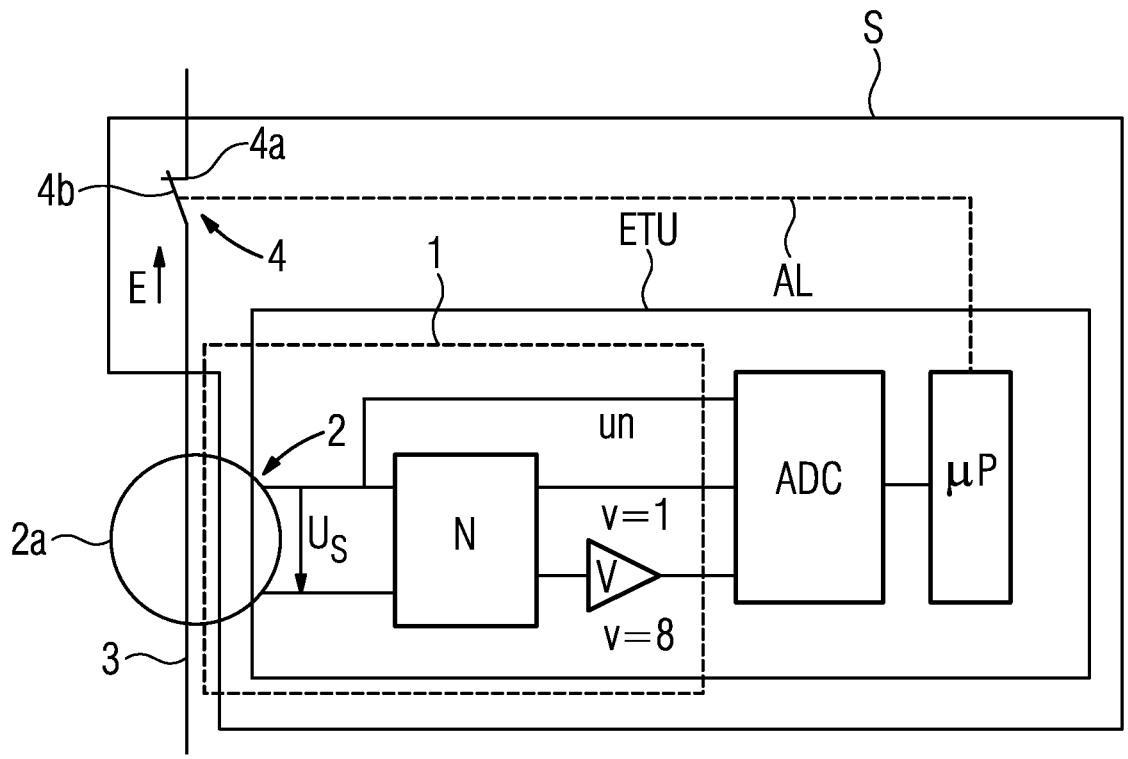
FIG. 1 shows an embodiment of a switch having a signal conditioning device which comprises an amplifier.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising,"

"includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

FIG. 1 shows a signal conditioning device 1 of a switch S, which signal conditioning device includes a sensor unit 2. The sensor unit 2 includes a sensor coil 2a (schematically illustrated as a circle) which surrounds an electrical conductor 3, wherein the conductor 3 represents the primary side and the sensor coil 2a represents the secondary side of an electromagnetic or transformer-type transducer. The sensor unit 2 emits, as an analog signal, an electrical voltage Us which is proportional to the electrical energy E flowing through the conductor. The energy E flows through the switch via mechanically separable contact elements 4a, 4b of a switching contact 4 which rest against one another when the switch S is closed.

The mechanical separation of the contact elements 4a, 4b is tripped by an electronic tripping unit ETU if the voltage Us and therefore the energy E satisfy a predefined condition, here if they exceed a predefined threshold value.

The switch can be designed for different nominal currents, which is why the voltage Us is normalized (normalization N) downstream of the sensor unit 2, that is to say the voltage Us is respectively in the same voltage range irrespective of the nominal comment of the switch downstream of the normalization N.

A downstream amplifier V additionally subjects the voltage Us to eight-fold amplification (v=8).

The voltage Us is then passed to an analog/digital converter ADC with a 12-bit resolution (corresponds to 4096 stages) in both non-amplified (v=1) and amplified (v=8) form. Generally speaking, the analog/digital converter ADC digitizes the differently amplified voltage Us or the differently amplified analog signal. It goes without saying that it would also be possible here to use two amplifiers, in which case one amplifier carries out 10-fold amplification, for example, and the other amplifier carries out 80-fold amplification. An amplification difference of eight-fold is expedient here but is not absolutely necessary.

The two digital values respectively generated by the analog/digital converter ADC are passed to the input of a microprocessor uP which digitally multiplies the voltage Us which has been subjected to one-fold amplification (v=1) by 8 and does not multiply (that is say virtually by 1) the voltage Us which has been subjected to eight-fold amplification (v=8).

The microprocessor uP uses the digital value of the voltage Us which has been subjected to eight-fold amplification, if this digital value is below 4095 digits, in a monitoring algorithm which checks in each case whether the threshold value has been exceeded. Below 4095 digits means: the analog/digital converter ADC has not been overloaded. Otherwise, the digital value of the voltage Us which has been subjected to one-fold amplification (v=1) is used by the monitoring algorithm for the check.

If the threshold value has been exceeded, the microprocessor uP generates a tripping signal AL and the switching contact 4 (schematically illustrated by the dashed line) is opened. Only if this digital value is at 4070 digits is the digital value of the non-amplified analog signal used to check the threshold condition.

Figure 2:
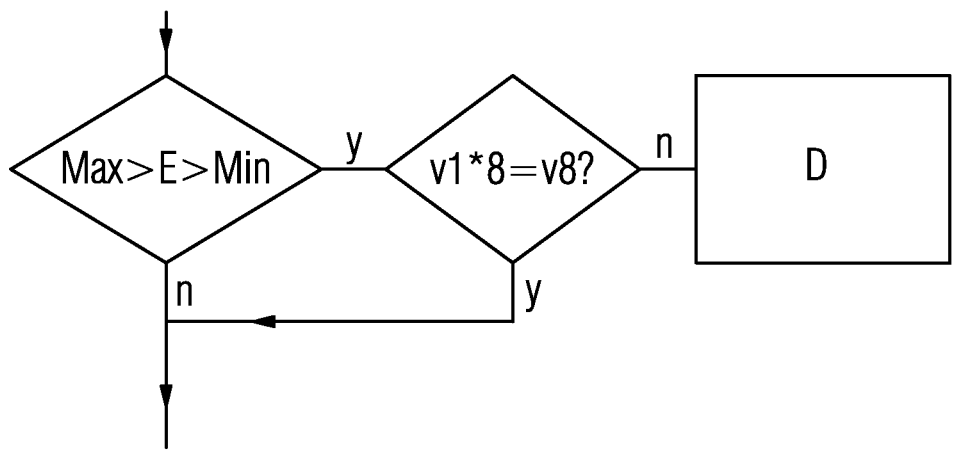
FIG. 2 shows a flowchart of an embodiment of a method for detecting a defective amplifier in the signal conditioning device according to FIG. 1.

In order to detect whether the amplifier V is defective, the process sequence according to FIG. 2 is carried out in each case. In the first step Max<E<Min, a check is carried out in order to determine whether at least one of the two digital values obtained by way of multiplication by 8 or 1 is in the range between 200 and 4000 digits and therefore in the predefined range.

If this is the case (y), a check is carried out in the next step in order to determine whether the two digital values (each belonging to the same time) are the same (v1*8=v8?), that is to say are in a predefined tolerance range, that is to say differ from one another by at most 10%. If the difference is greater, and they are therefore outside the tolerance range, there is a defect and a fault D is signaled. However, provision may also be made for the switch S to be tripped if such a fault D is present.

The voltage Us or the analog signal is passed, in unnormalized form, to the analog/digital converter ADC on a separate amplification channel un and its digital value is subjected to a short-circuit monitoring algorithm which runs on the microprocessor uP in addition to the "normal" monitoring algorithm. This makes it possible to detect a short circuit via the amplification channel un and to respond in a corresponding manner, thus increasing the reliability of the tripping unit. This functions even when defects occur in the amplifier V.

What is claimed is:

1. A method for detecting a defective amplifier in an analog signal conditioning device of a switch including mechanically separable contact elements and a tripping unit which respectively carries out a first check downstream of the analog signal conditioning device to determine whether electrical energy flowing via the contact elements satisfies a condition and trips a separation of the contact elements if the condition has been satisfied, the analog signal conditioning device including at least one sensor unit to respectively emit an electrical analog signal proportional to the electrical energy, and at least one downstream amplifier to amplify the electrical analog signal, an analog-to-digital converter being connected downstream and configured to receive the electrical analog signal and the amplified electrical analog signal and output the electrical analog signal and the amplified electrical analog signal as first and second digital values, respectively, the electrical analog signal and the amplified electrical analog signal being received by the analog-to-digital converter simultaneously, wherein a decision is made regarding which of the first and second digital values is used to check the condition, the method comprising:

performing a second check to determine whether at least one of the first and second digital values is in a defined range;

multiplying the first digital value by a number corresponding to an amplification factor of the at least one downstream amplifier;

determining whether the multiplied first digital value and the second digital value are in a defined tolerance range of each other based on the performing; and signaling a fault if the multiplied first digital value and the second digital value are determined not to be in the defined tolerance range.

2. The method of claim 1, wherein the determining includes comparing the multiplied first digital value and the second digital value.

3. The method of claim 1, wherein the signaled fault indicates a hardware defect of the at least one downstream amplifier.

4. The method of claim 1, further comprising:

determining if the first digital value exceeds a threshold, wherein the performing the second check is based on whether the first digital value exceeds the threshold.

* * * * *